United States Patent [19]

Takahashi et al.

[11] Patent Number: 5,027,337

[45] Date of Patent: Jun. 25, 1991

[54] OPTICAL RECORDING MEDIUM AND TRACKING METHOD THEREFOR

[75] Inventors: Shunzo Takahashi; Shigeru Izawa; Hidefumi Suzuki; Takashi Hasemi, all of Tokyo, Japan

[73] Assignee: CSK Corporation, Tokyo, Japan

[21] Appl. No.: 501,333

[22] Filed: Mar. 22, 1990

Related U.S. Application Data

[63] Continuation of Ser. No. 30,996, Mar. 27, 1987, abandoned.

[30] Foreign Application Priority Data

| Mar. 28, 1986 | [JP] | Japan | 61-69876 |
| May 12, 1986 | [JP] | Japan | 61-108154 |
| Jun. 13, 1986 | [JP] | Japan | 61-138730 |

[51] Int. Cl.$^5$ .............................................. G11B 7/00
[52] U.S. Cl. ............................ 369/44.26; 369/44.27; 369/44.41
[58] Field of Search ............... 369/44.14, 44.41, 44.26, 369/44.27; 235/454

[56] References Cited

U.S. PATENT DOCUMENTS

| 4,094,010 | 6/1978 | Pepperl et al. | 369/44 |
| 4,290,122 | 9/1981 | Bates et al. | 369/46 X |
| 4,507,763 | 3/1985 | Kato | 369/44 |
| 4,562,577 | 12/1985 | Glover et al. | 369/44 X |
| 4,577,301 | 3/1986 | Matthews et al. | 369/44 |
| 4,598,196 | 7/1986 | Pierce et al. | |
| 4,598,393 | 7/1986 | Pierce et al. | |
| 4,686,662 | 8/1987 | Baer | 369/111 X |
| 4,730,293 | 3/1988 | Pierce et al. | 235/454 X |
| 4,787,085 | 11/1988 | Matsuoka et al. | 235/454 X |
| 4,924,455 | 5/1990 | Fujiie et al. | 369/44.21 |

FOREIGN PATENT DOCUMENTS 0164131  12/1985  European Pat. Off. .
58-50046  2/1983  Japan .

Primary Examiner—Robert L. Richardson
Attorney, Agent, or Firm—Lowe, Price, LeBlanc and Becker

[57] ABSTRACT

An optical recording medium has a data storage section including data tracks and tracking lines formed in the data storage section for reading or writing data. The optical recording medium includes an elongated recording region defined between each two adjacent tracking lines, each of the data recording regions having at least one data track disposed offset from the center of the data recording region. The tracking method for the medium includes establishing a first optical detection region on the medium for detecting the tracking line position relative to the detection region and establishing a second optical detection region on the medium for reading or writing which is positioned in a fixed relationship to the first optical detection region. The first and second optical detection regions are positioned with respect to each other so that when the first optical detection region is tracking the tracking line, the second optical detection region is positioned for reading or writing along the data track at a position laterally offset from the center of the data recording region.

4 Claims, 9 Drawing Sheets

OPTICAL RECORDING MEDIUM AND TRACKING METHOD THEREFOR

This application is a continuation of application Ser. No. 07/030,996 filed Mar. 27, 1987 now abandoned.

FIELD OF THE INVENTION

This invention relates to an optical recording medium which is capable of setting a plurality of data tracks in a data recording region extending as an elongated strip between tracking lines. The data tracks are established so as to extend along the tracking lines. This invention further relates to a tracking method for reading or writing data from or into the data tracks in the respective data recording region.

BACKGROUND OF THE INVENTION

Optical recording media which have recently been developed are advantageous in that they have a recording or storing capacity much larger than that of conventional magnetic recording media. This is due to a feature of the optical recording media that it can record or store data at a high density within a small area. To read the data recorded at a high density in a small area or write data into a small area at a high density, recording/writing elements must accurately track the data recorded on the media or data track in which the data is to be recorded.

For this purpose, heretofore, there has been known a system in which a data track is set centrally in an elongated data recording region which is provided between each two adjacent tracking lines provided at predetermined intervals on a optical recording medium.

According to the system, two tracking lines, between which the recording region is provided, are used for effecting the reading/writing operation, i.e., they are traced or followed to read or write the data on the data track in the data recording region. Thus, highly accurate reading/writing operation can be assured.

In such a system, a single data track is provided in one band of data recording region, so that the data tracks and the tracking lines are arranged alternatingly in a data storage section of the optical recording medium. Due to this structural feature, this system has such a disadvantage that the data recording capacity in a limited size of the medium is prevented from being increased due to the spaces occupied by the tracking lines provided for every data track.

To solve this problem, it can be considered to reduce the distance between the tracking lines. In effect, however, there is a limit in the shortening of the intervals between the tracking lines, for a technical reason such as a technical difficulty of forming minute patterns of the tracking lines in the manufacturing process of the medium.

It is therefore an object of the present invention to provide an optical recording medium which is capable of setting a plurality of data tracks within a data recording region, allowing high-density data recording, thereby to remarkably increase a recording capacity.

It is another object of the present invention to provide a tracking system adapted for an optical recording medium in which a plurality of data tracks are set within one data recording region, which system is capable of effectively reading or writing data from or into each of the data tracks.

SUMMARY OF THE INVENTION

The present invention features an optical recording medium having data storage section provided on the optical recording medium and data tracks and tracking lines formed in the data storage section for reading or writing data, which medium comprises at least one band of data recording region defined between each two adjacent tracking lines, each of said data recording regions having at least one data track at a position deviated from the center of the width of the data recording region.

The present invention further features a tracking method for an optical recording medium having data tracks extending along tracking lines in a data storage section of the medium, for reading or writing data, which method comprises:

setting, on the optical recording medium, a first optical domain for detecting the tracking line through relative movement with respect to the optical recording medium and a second optical domain for reading or writing, which is movable in association with said first optical domain; and setting the positional relationship between the first and the second optical domain so that when the first optical domain for track detection is following the tracking line, the second optical domain for the reading or writing is moving on and along the data track on the position deviated from the center of the width of the data recording region.

In the optical recording medium according to the present invention, at least one data track is provided at a position deviated from the center of the width of the data recording region. The positions of the respective data tracks are suitably selected so that the data tracks may not be overlapped each other. The positions of the data tracks are determined, considering the width of the data recording region, the width of the data track, the number of the data tracks to be provided, etc. In the case where a plurality of data tracks are provided, one of them may be disposed at the center of the width of the data recording region.

In the tracking method according to the present invention, an optical domain for tracking or detecting the tracking line is, for example, formed by a light spot which is obtained by projecting a light beam such as a laser beam onto the optical recording medium through an optical system. Reflected light of this tracking optical domain is guided to enter a photodetector through the optical system to detect a tracking control signal for controlling the tracking operation.

Similarly, an optical domain for carrying out the reading or writing is also formed by a light spot which is obtained by projecting a light beam such as a laser beam onto the optical recording medium through the optical system. In the writing operation, the light energy provided by the light spot causes an optically changed pattern on a position where the data track is set in the data recording region. In the reading operation, the reflection intensity of the light spot according to the optically changed pattern formed on the position in which the data track is set, is detected to read a signal written therein.

However, in the case where all over the data recording regions are generally irradiated, the optical domains for tracking and reading may be provided not in the form of the light beam irradiation but in the form of visual fields of photodetectors with respect to the data recording regions.

According to the tracking method of the present invention, the optical domain for detecting the tracking line and the optical domain for reading or writing data are set so as to have a specific positional relationship therebetween. More particularly, since a plurality of data track is set within one data recording region, according to the present invention, it is necessary to position the reading/writing optical domain at different data tracks within the same data recording region Various methods may be adopted to attain this. For example, a plurality of tracking optical domains at different positions are provided in association with the reading/writing optical domain In this case, either one of the tracking optical domains may be selected for detecting the tracking line so that the reading/writing optical domain may be selectively positioned on the desired data track. Or, two optical domains include an optical domain for tracking and an optical domain for reading/writing and the distance between the two optical domains is changed or the arranging order of the domains is changed by 180° to differentiate the positional relation therebetween for locating the domains at the different positions.

The tracking may be effected in various modes More particularly, the detection of the tracking lines may be based on the center of the width of the tracking line or based on the edge of the tracking line. The tracking of the present invention may be carried out by either of these.

In a preferred mode of the present invention, a tracking line adjacent to the data recording region, in which the data track to effect the desired reading or writing is, used as a reference, but another tracking line may also be used as a reference.

OPERATION

In the present invention, a data track is provided at a position deviated from the center of the width of the data recording region. Therefore, plural data tracks can be provided within one data recording region, allowing high-density recording of data.

According to the tracking method of the present invention, the optical domain for track detection and the optical domain for reading/writing are moved in association with each other. Furthermore, the optical domain for track detection and the optical domain for reading/writing are disposed with a predetermined positional relationship therebetween. More specifically, when the optical domain for track detection is detecting the tracking line, the optical domain for reading/writing moves on and along a line located at a position deviated from the center of the width of the data recording region. Therefore, if the tracking line to be tracked is selected, the data track to be read or written is determined. By this reason, if the tracking line is tracked by the track detecting optical domain, on the basis of the center of the tracking line or the edge of the tracking line, the reading/writing optical domain will track the data track depending upon the positional relation with the track detecting optical domain.

With this arrangement, if the data tracks are set at positions symmetrically deviated from the center line passing through the center of the width of the data recording region, an optical recording medium may have an even multiple number of data tracks within one data recording region. Thus, the density of the data tracks can be increased even multiple times. A typical example of such an optical recording medium has two data tracks within one data recording region, attaining a doubledensity recording. However, the data recording region, of course, may have a single data track.

In the present invention, one of the data tracks may be provided at the center of the width of the data recording region. In this case, three or more, odd multiple number of data tracks can be provided within the data recording region. A typical example of this optical recording medium having an odd multiple number of data tracks is a triple-density optical recording medium having three data tracks within one data recording region.

As described above, plural data tracks can be set within one data recording region, allowing a high-density data recording to remarkably increase the recording capacity. This high-density recording can be attained without requiring special precision and the increase in the storage capacity can be attained easily at a reasonable cost.

DESCRIPTION OF PREFERRED EMBODIMENT

Figure 1:
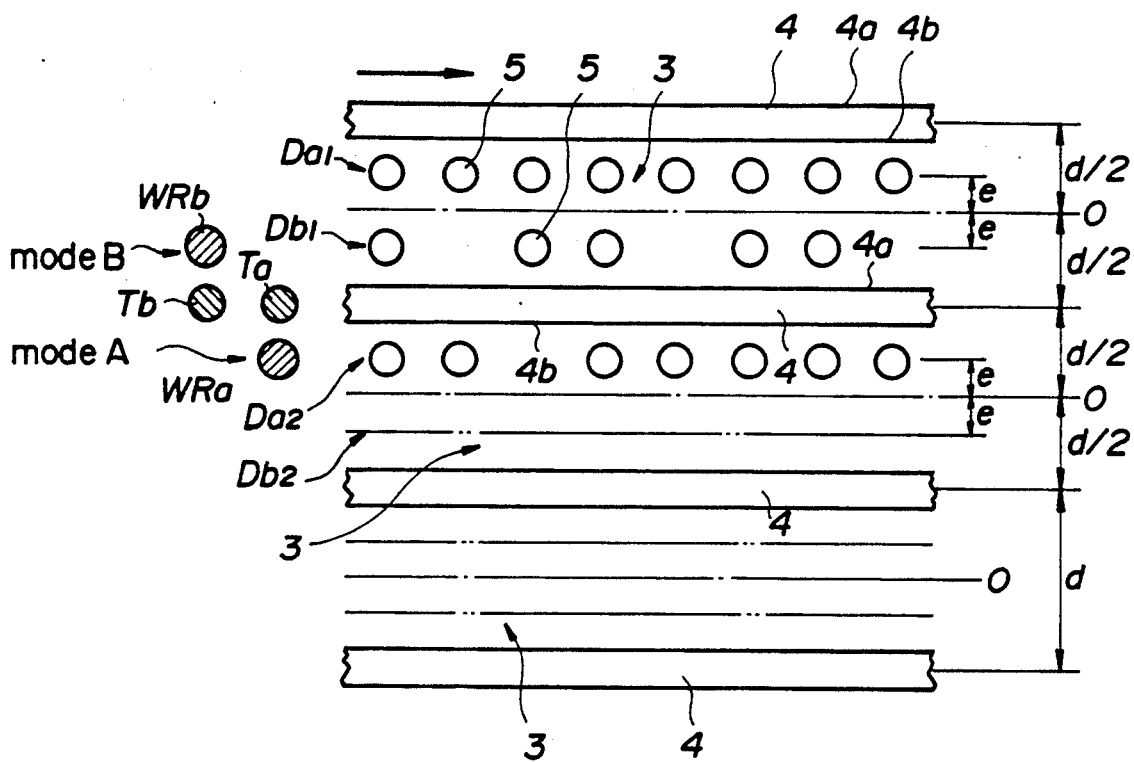
FIG. 1 is an explanatory view showing a first form of an optical recording medium embodying the present invention and a tracking system therefor according to the present invention.

Embodiments of the present invention will now be described, referring to the drawings A tracking method employed in the respective embodiments as will be described hereinafter uses an apparatus having both the reading and the writing function The tracking method of the present invention, however, can also be applied to an apparatus adapted simply to function as the reading or writing apparatus.

First Embodiment

Figure 2:
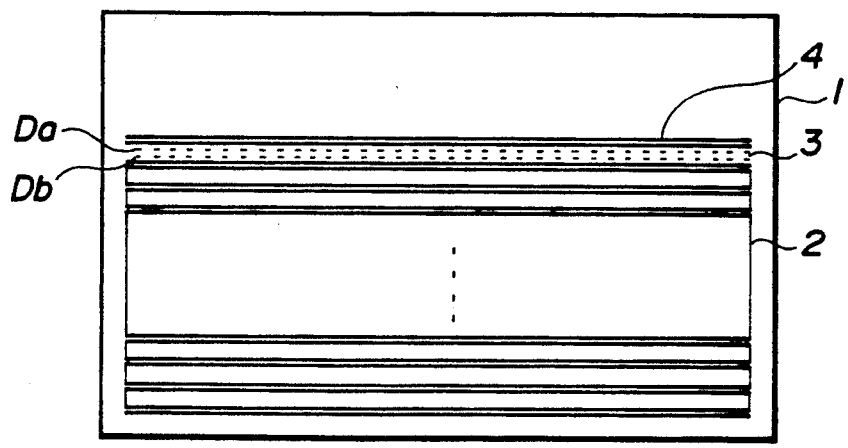
FIG. 2 is a plan view of the first form of the optical recording medium according to the present invention.

FIGS. 1 and 2 illustrate a configuration of a first form of an optical recording medium embodying the present invention.

This optical recording medium 1 has a storage section 2, in which an information storage material is provided The storage section 2 includes a plurality of tracking lines 4 at predetermined intervals, which define elongated data recording regions 3 between each two adjacent tracking lines 4.

According to the present embodiment, two data tracks Da and Db are set within each of the data recording regions 3 to attain double-density recording. The data tracks Da and Db are formed at positions deviated symmetrically from a center line 0 of the width of the data recording region 3, respectively. More specifically, the data tracks are provided at positions deviated by e from the center 0 of the width of the data recording region 3. In the embodiment as illustrated, the deviation e is determined so that 2e is a bit smaller than d/3 if a pitch or interval of the tracking lines 4 is assumed as d.

With the formation as described above, the data tracks Da and Db are arranged with an interval of 2e therebetween. The data tracks Da and Db are disposed at positions remote by $(d/2) - e$ from the center of the respectively adjacent tracking lines 4.

The setting positions of the data tracks Da and Db may be determined based on edges 4a and 4b of the tracking line 4.

In FIG. 1 (and other similar figures), the data tracks Da and Db are provided in each of the data recording regions 3. Therefore, if it is necessary for explanation to distinguish data tracks in one data recording region from data tracks in another data recording region, suffixes are used to indicate the data recording regions as Da1, Db1, Da2, Db2. Also in the figures, small circles denote that data are written and phantom lines denote positions of data tracks in which no data have been written yet.

For the tracking of the optical recording medium of FIGS. 1 and 2, a light spot T corresponding to optical domain for tracing the tracking line (hereinafter referred to as "track detecting spot T") and a light spot WR corresponding to an optical domain for reading or writing data (hereinafter referred to as "reading/writing spot WR") are so disposed that the latter is located on the data track Da or Db which is deviated by e from the center 0 of the width of the data recording region 3 when the former is tracing the tracking line 4. Therefore, the track detecting spot T and the reading/writing spot WR are disposed so as to be spaced by $(d/2) - e$ from each other as shown in FIG. 1.

FIG. 1 shows two modes of tracking according to the present embodiment. Suffixes denote the modes, respectively.

The interval between the light spots T and WR corresponds to a distance between the data track Da or Db and the center of the respectively adjacent tracking line 4 as described in relation with the first form of the optical recording medium as illustrated in FIGS. 1 and 2. More particularly, when the track detecting spot T and reading/writing spot WR are juxtaposed in the width direction of the data recording region 3 and the former is positioned on the tracking line 4, then a line passing through the latter coincides with the data track Da or Db.

In the present embodiment, two light spots are assigned for tracking as a track detecting spot T and for reading/writing as a reading/writing spot WR. However, this assignment is not fixed and the positional relation between the light spots for track detection and reading/writing may be inverted for effecting the tracking of another data track.

Figure 3:
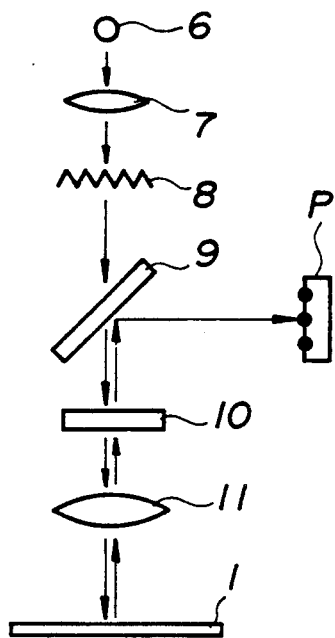
FIG. 3 is an explanatory view of an optical system employable for implementing the tracking system for the optical recording medium according to the present invention.

The track detecting light spot T and the reading/writing light spot WR are formed, for example, by an optical system as illustrated in FIG. 3. More specifically, the optical system as shown in the figure comprises a light source 6 such as a semiconductor laser source, a collimating lens 7 for making the light emitted from the light source 6 to parallel beams, a diffraction grating 8 for splitting a light beams into a plurality of beams, a beam splitter 9 which separates a transmitted beam from a reflected beam, a quarter-wavelength plate 10 for making the polarization plane of an incident beam into the optical recording medium perpendicular to that of a reflected beam from the optical recording medium, and an objective lens 11.

This optical system can be used either for the reading or the writing operation. In the writing, an output energy of the light source 6 is increased to irradiate a light beam spot of high energy on the data recording region, locally melting the irradiated portion or locally darkening the irradiated portion to write data. In the reading, the light energy to be irradiated on the data recording region is reduced so as not to cause a change in the data recording region. The data is converted into digital data and written, for example, in the form of presence and absence of spots 5.

The diffraction grating 8 diffracts a light beam to form a plurality of beams spaced from each other. In the present embodiment as illustrated, a mask means not shown is used to take a main beam and a sub beam out of the plural split light beams. The sub beam is used as a beam for detecting the tracking line and the main light beam is used as a reading/writing beam. The positional relationship between these beams corresponds to the relationship between the reading/writing spot WR and the track detecting spot T. In other words, those beams constitute the reading/writing spot WR and the track detecting spot T in this embodiment.

The diffraction grating 8 may be changed to change the spacings between the beams and therefore change the spacings between the reading/writing light spot WR and the track detecting light spot T. This may also be done in the embodiments as will be described later, according to necessity.

In the present embodiment, a beam position rotating element (not shown) is removably provided after the diffraction grating 8, for rotating a spatial arrangement relation between the main beam and the sub beam by 180° around the sub beam. This element is formed, for example, by an optical element such as a lens system, prism, etc. When this element is inserted into an optical path, the main beam and the sub beam are projected onto the optical recording medium with the relation as they have. Therefore, for example, the reading/writing light spot WRb (main beam) and the track detecting light spot Tb (sub beam) are formed in the mode B as illustrated in FIG. 1. On the other hand, when the beam position rotating element is inserted into the optical path, the main beam and the sub beam are projected onto the optical recording medium with the relation rotated by 180° around the sub beam. As a result of this, the light spots WRa and Ta are formed in the mode A as illustrated in FIG. 1.

A photodetector train P is provided in combination with the optical system as described above and it receives a light beam taken out of the optical system by the beam splitter 9 to function as a tracking and a reading sensor.

Figure 4:
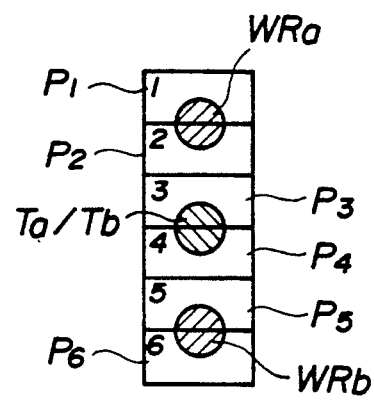
FIG. 4 is an explanatory view of one example of a train of photodetectors.
Figure 5:
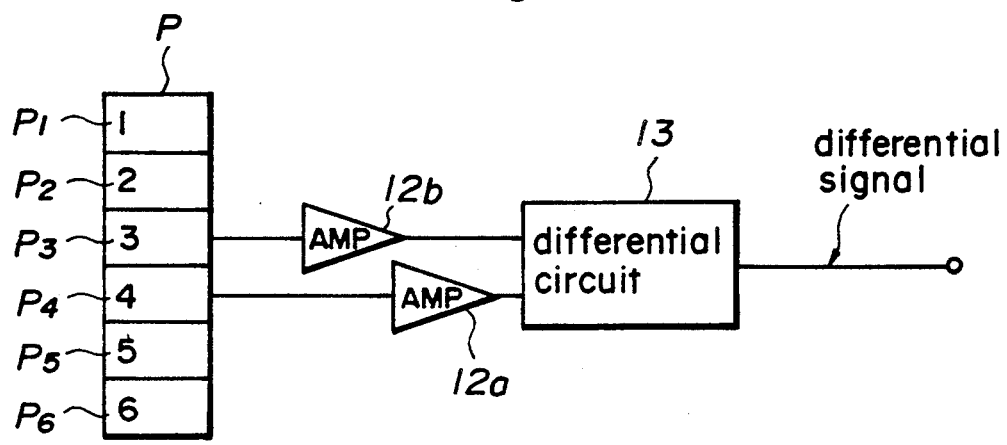
FIG. 5 is a circuit diagram of a track detecting circuit employable for implementing the first embodiment of the tracking system according to the present invention.

This photodetector train P includes semiconductor photodetector such as PIN photodiodes. It is, for example, formed of a plurality of photodetectors P1 to P6 arranged in array as illustrated in FIG. 4. In the present embodiment, a pair of photodetectors P1 and P2 and another pair of photodetectors P5 and P6 are provided for reading and a photodetector P3 and an photodetector P4 are provided for tracking As illustrated in FIG. 4 and as described above, two sets of reading photodetectors are provided while only one reading/writing spot WR is used. This is because the reading/writing spot WR and the track detecting spot T are rotated by 180° by inserting the above-mentioned beam position rotating element into the optical path when the data is written into either of the data tracks on the opposite sides of the tracking line 4. Therefore, one set of reading photodetectors will, of course, suffice if the reading is carried out without using the element to rotate the positional relation between the light beams by 180°.

With this arrangement of the present embodiment, the photodetectors P3 and P4 are fixedly used as photodetectors for detecting the tracking lines. Therefore, outputs of the respective photodetectors P3 and P4 are connected a differencial circuit 13 through amplifiers 12a and 12b, respectively. On the other hand, the pair of the photodetectors P1 and P2 and the pair of the photodetectors P5 and P6 are connected to a not shown reading circuit.

In this connection, it is to be noted that if the mode is changed by exchanging the positional relations between the sub beam and the main beam by a method as will be described later, only two sets of photodetectors are provided. In this case, one is used as a tracking purpose and the other is used for reading alternatingly and accordingly, the tracking circuit and the reading circuit are switched alternatingly.

As described above, since two light spots are used in the present embodiment, the writing of data is carried out in two modes, mode A and mode B. For example, in the mode A, when the track detecting light spot Ta is used on the tracking line 4 in FIG. 1, the other light spot, reading/writing spot WRa is associated with the data track Da of the data recording region 3. In the mode B, one of the light spot, tracking spot Tb is on the tracking line 4, the other spot WRb for reading/writing is associated with the data track Db of the data recording region 3. The mode A and the mode B is in such a relation that the reading/writing spot WR is rotated by 180° around the track detecting spot T in each of the modes, respectively. More particularly, the arrangement of the light spots T and WR are inverted as shown in FIG. 1. In the present embodiment, the mode B is of a normal arrangement and the mode A is of a rotated arrangement.

As described above, to adapt the reading/writing spot WR for the position of the object data track, the objective lens 11 or the entire optical system including the photodetectors is moved to shift the reflected light of the reading/writing spot WR together with the reflected light of the tracking spot T in the direction of the array of the photodetector train P. According to the present embodiment, when a boundary line between the photodetectors P3 and P4 coincides with a center line of the tracking line 4 formed, as a reflected image, on the photodetectors P3 and P4, the boundary line between the photodetectors P1 and P2 coincides with a center line of the target data track Da formed, as a reflected image, on the photodetectors P1 and P2 in the mode A. Whereas, the boundary line between the photodetectors P5 and P6 coincides with a center line of the data track Db formed, as a reflected line, on the photodetectors P5 and P6 in the mode B.

If the photodetectors P3 and P4 catch the tracking line 4 within their fields of vision with the center of the line being not deviated therein, amounts of light received by the respective photodetectors are large and the distributions of the lightness are substantially equal between the photodetectors. On the other hand, if the tracking line is caught within the fields of vision with its center being deviated, the amounts of light received are small and the distributions of the lightness are not equal between the photodetectors. The present embodiment utilizes this feature for the purpose of tracking the tracking line.

The tracking operation according to the present embodiment will now be described, referring to the tracking operation in the data writing operation using FIGS. 1 to 5. It should be noted that the tracking operation is identical in the reading operation.

It is now assumed that data is written in any given data recording region 3 of the storage section 2.

In the optical system, the light from the light source 6 is divided into two beams through the collimating lens 7 and the diffraction grating 8. The beams are irradiated onto the optical recording medium 1 through the beam splitter 9, the quarter-wavelength plate 10 and the objective lens 11. The two light beams form a tracking spot T and a reading/writing spot WR on the optical recording medium 1. The reflected light returns to the beam splitter 9 through the objective lens 11 and the quarter-wavelength plate 10. At this time, since the respective beams transmit through the quarter-wavelength plate 10 two times, the reflected light has a polarization plane which is rotated by 90° from that of the light from the light source 6. Therefore, the reflected light is further reflected by the beam splitter 9 to be emitted out of the optical system.

The so emitted light beams from the tracking spot T and the reading/writing spot WR are incident upon the photodetector train P and form images of the respective spots on the photodetector train P as shown in FIG. 4. In the mode A, images of the spots Ta and WRa are formed and in the mode B, images of the spots Tb and WRb are formed.

The photodetectors (P4, P3) and the photodetectors (P6, P5) or (P2, P1) output photo-currents which are substantially proportional to the amounts of lights incident thereupon, respectively.

The photo-current outputs from the photodetectors P3, P4 are amplified with respect to voltages thereof by the amplifiers 12a, 12b, respectively, and input to the differential circuit 13. Thus, the differential signal is detected. At this time, if the distributions of the amounts of lights of the light beam image formed by the light beam of the tracking spot T irradiated over the pair of photodetectors P3, P4 are equal between photodetectors, then the photo-currents from the respective photodetectors are substantially equal. In this case, the differential signal is zero. This is a case where the tracking line 4 is positioned within the tracking spot T with the centers of the tracking line and the tracking spot being coincident. If the center of the tracking spot T is not coincident with the center of the tracking line 4, the photo-outputs from the photodetectors P3, P4 will not be equal and a differential signal corresponding to the difference will be output.

This differential signal is output as a tracking error signal after being amplified by an amplifier not shown. The tracking error signal is utilized as a tracking error alarming signal or tracking error correcting signal. For example, when the center of the tracking spot T does not coincide with the center of the tracking line 4, there is caused a difference in output signals between the photodetectors P3, P4. A control mechanism not shown is actuated to drive the objective lens 11 to minimize the resulting differential signal for correcting the tracking error. However, if the amount to be corrected is large, the optical system and the optical recording medium are moved relatively with respect to each other to correct the error.

If it is assumed that writing is carried out in the mode B, the reading/writing spot (which is referred to as "WRb" in the mode B) is located on the target data track Db if the tracking is all right. Then, the output of the light beam is increased so that it may function as a reading/writing spot WRb irradiating a specific portion of the data track. As a result of this, the beam irradiated portion is locally changed, for example, melted or darkened, to cause a changed portion differentiated, in optical conditions such as reflectivity etc., from the remaining background of the recording region, in the form of an image of the reading/writing spot WRb. This optically changed portion forms a spot 5 to record data as a digital value.

Figure 6:
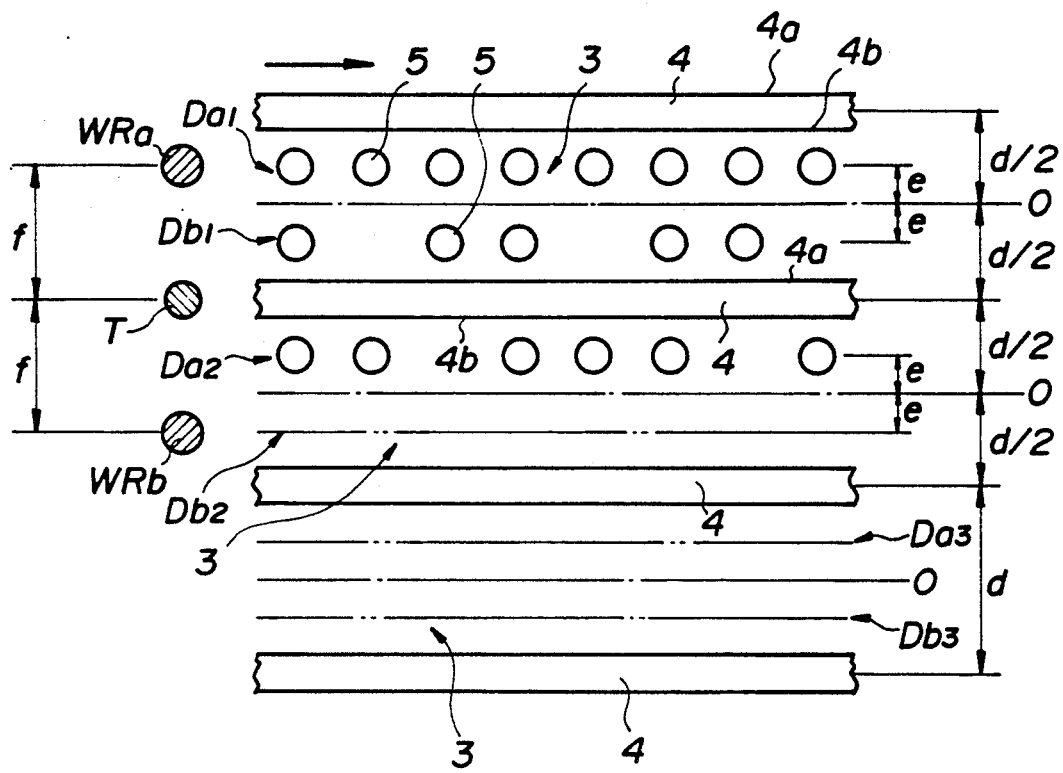
FIGS. 6 to 9 are explanatory views each showing second to fourth embodiments of the present invention, respectively.
Figure 7:
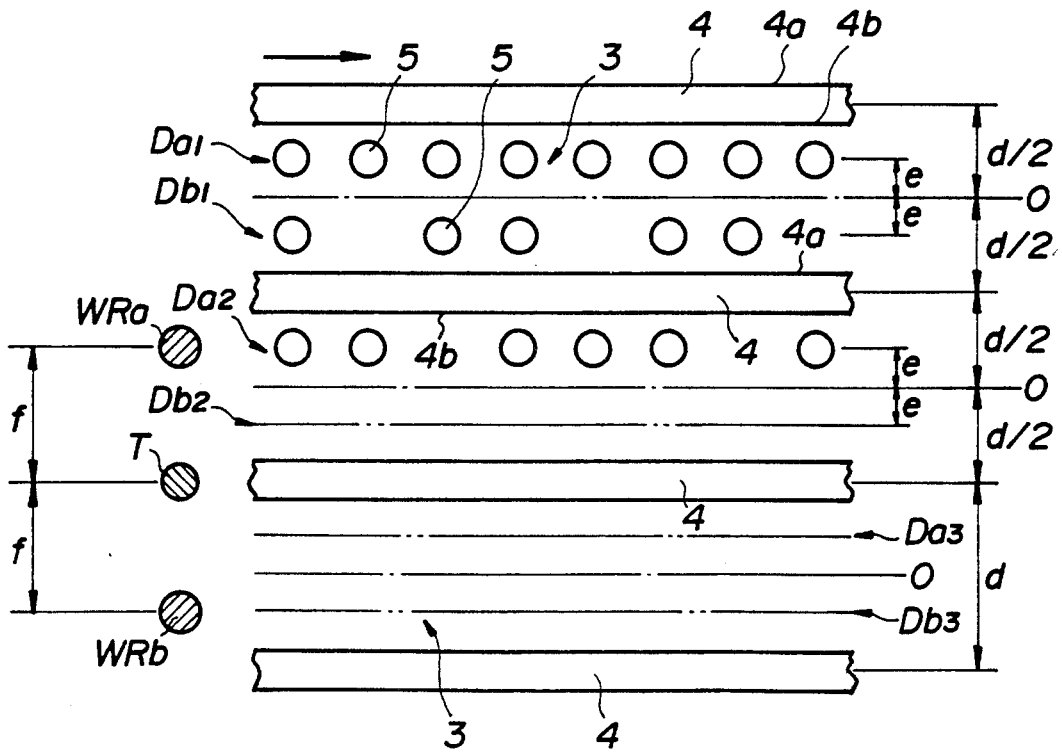

In the present embodiment, data writing is carried out, while the optical recording medium being relatively moved in a direction as indicated by an arrow in FIG. 1 by a drive apparatus not shown. In the course of this movement, when the reading/writing spot WR reaches the next position of a spot to be written, the irradiation intensity of the light beam is increased to effect the writing operation. Thus, data is sequentially written according to the data to be written as illustrated in FIGS. 6 and 7. Of course, the relative movement of the optical recording medium may once be stopped to effect the writing operation and then may be moved to the next writing position.

Immediately after the writing operation, the data written in the pertinent data track Db is read by the photodetectors P5, P6 as illustrated in FIG. 4 and utilized for collation with the data to be written for checking a possible writing error.

Then, the beam position rotating element (not shown) is inserted between the diffraction grating 8 and the beam splitter 9 to change the mode from B to A. As a result of this, the position of the reading/writing spot WR is inverted around the track detecting spot T. Therefore, the reading/writing spot WR (hereinafter referred to as "WRa" in the mode A) is associated with a data track Da of the succeeding data recording region next to the data recording region as described above.

In a similar way as described above, the data on the data track Da is read by the photodetectors P1, P2 and utilized for a writing error check.

Although the photodetectors P1, P2 and P5, P6 are used in pairs in the photodetector train P as described above, two photodetectors will suffice if only the reading operation is desired. In the present embodiment, focussing control is also effected in addition with the reading operation. The photodetectors P1, P2, P5, P6 may be used only for the focussing operation. In this case, further photodetectors may be provided for the reading operation.

After completion of the writing of the data into the data track, the optical system and the optical recording medium are relatively moved in a direction of the width of the data recording region with respect to each other to set the tracking spot T (Tb/Ta) to a position of the next tracking line 4. In the present embodiment, the mode A and the mode B are changed in such a manner that data is written in one of the mode and then written in another mode throughout all the data recording regions, data is written in the two modes alternatingly with the respective data recording regions, or data is written in the two modes alternatingly with the respective spots 5 in the data recording region.

The data is thus sequentially written along the tracking line and this operation may be repeated to write data in all the data tracks. In this case, if means for counting the number of the tracking lines is provided, random access of the data track may be effected.

When the data is read in the present embodiment, the intensity of the light beam is lowered so as not to cause local melting at a portion where the light beam has been irradiated.

Although the positional relation between the main beam and the sub beam is changed by rotating the main beam around the sub beam by 180°, the change of the positional relation between the beams may be effected in other suitable manners Another example of changing the relation includes employment of inverter element for inverting the intensity ratio of the main beam to the sub beam. In this case, two sets of photodetectors will suffice.

A further example of changing the relation may be such that a beam position rotating element similar to that used in the above-mentioned embodiment is used to rotate the main beam and the sub beam around a central position therebetween by 180° to exchange their positions each other. In this case, two pairs of photodetectors will suffice.

Second Embodiment

FIGS. 6 and 7 illustrate another mode of data tracking method for the optical recording medium according to the present invention.

This embodiment is an example of the tracking method usable for recording data at a double density on an optical recording medium having two data tracks Da and Db in each of data recording regions 3 as in the first embodiment.

In this embodiment, a tracking spot T and a reading/writing spot WR are so disposed that the latter can write data at a position deviated by e from a center 0 of the width of the data recording region 3 when the former is tracking the tracking line 4. The reading/writing spot WR is formed of two detecting spots WRa and WRb which are disposed symmetrically on the both sides of the tracing spot T. The reading/writing spots WRa, WRb are not necessarily formed simultaneously.

The single tracking spot T and the two reading/writing spots WRa and WRb on the opposite sides of the tracking spot T are spaced by a distance f. In the present embodiment as illustrated, the two reading/writing spots WRa, WRb are so spaced that they are located on data tracks not adjacent to the tracking line 4, which the tracking spot T is tracking, but next (outer) to the adjacent ones. If a distance between the centers of the respective tracking lines 4, 4, between which the data recording region 3 is, is assumed as d, the distance f is obtained from the above-mentioned relation as follows:

$$f = \frac{d}{2} + e$$

The tracking spot T and the reading/writing spots WRa, WRb are formed by an optical system having a light source comprising a semiconductor laser source is added to the optical system as illustrated in FIG. 3. More specifically, a light beam from the added light source is superimposed on the plural light beams formed by the diffraction grating 8 to produce two main beams and one sub beams for forming light spots.

The central sub beam of the three beams thus formed is used as a beam for tracking the tracking line and the main beams on the opposite sides thereof are used as beams for reading or writing. The positional relationship between these beams corresponds to the positional relationship between the tracking spot T and the reading/writing spots WRa, WRb. More specifically, these beams form the tracking spot T and the reading/writing spots WRa and WRb, respectively, on the optical recording medium.

The photodetector train P provided in combination with the optical system according to the present embodiment is formed in array as illustrated in FIG. 4. The pitches between the pairs of photodetectors (P1, P2), (P#, P4), (P5, P6) and (P7, P8) are selected so as to be adapted for the positions of the reflected images of the respective spots. The pair of photodetectors P1, P2 and the pair of photodetectors P5, P6 are for reading and the pair of photodetectors P3, P4 is for tracking.

The reading/writing spots WRa, WRb and the tracking spot T are shifted in a direction of the array of the photodetector train P by driving the objective lens 11 so as to put the reading/writing spots WRa, WRb onto the data tracks Da and Db, respectively. As a result of the shifting, when the boundary line between the photodetectors P3 and P4 coincides with the center line of the tracking line 4, the boundary line between the photodetectors P1 and P2 is located on the center line of the data track Db and the boundary line between the photodetectors P5 and P6 is located on the center line of the data track Da.

The tracking operation for data writing according to the present embodiment will now be described, specifically noting the differences from the first embodiment. The tracking operation for the data reading is also identical with that of the data writing.

Now, it is assumed that data is written in a given data recording region 3 of the recording area 2.

In the optical system, the light from the light source 6 is split into three beams through the collimating lens 7 and the diffraction grating 8. The beams are superimposed with a light beam from the additional light source and irradiated onto the optical recording medium 1 through the beam splitter 9, the quarter-wavelength plate 10 and the objective lens 11. The three light beams form a tracking spot T and reading/writing spots WRa, WRb on the optical recording medium 1. The reflected light returns to the beam splitter 9 through the objective lens 11 and the quarter-wavelength plate 10. At this time, since the respective beams transmit through the quarter-wavelength plate 10 two times, the reflected light has a polarization plane which is rotated by 90° from that of the light from the light source 6. Therefore, the reflected light is further reflected by the beam splitter 9 to be emitted out of the optical system.

The so emitted lights from the tracking spot T and the reading/writing spots WRa, WRb are incident upon the photodetector train P and form images of the respective spots on the photodetector train P as shown in FIG. 4.

The photodetectors (P4, P3) and the photodetectors (P6, P5) and (P2, P1) output photo-currents which are substantially proportional to the amounts of lights incident thereupon, respectively.

The photo-current outputs from the photodetectors P3, P4 are utilized for detection of the tracking line as in the first embodiment.

In this connection, it is to be noted that a control unit (not shown) outputs an instruction which one of the two reading/writing spots WRa, WRb is to be used for the data writing.

If it is assumed that a selecting signal is output for selecting the reading/writing spot WRa on the data track Da1, the light beam for forming the reading/writing spot WRb on the data track Db2 is shielded by some suitable means not shown and the output of the light beam is irradiated so as to locally melt the beam irradiated portion. Thus, data is written. In this embodiment, data is written one by one. For this purpose, the optical recording medium is relatively moved in a direction as indicated by an arrow in FIG. 6 to sequentially write the data.

At this time, the photodetectors P5, P6 read the data written in the data track Da1 as shown in FIG. 4 and the read data is utilized for collation with the data to be written for writing error check.

If a selecting signal for selecting the data track Db is output, writing is carried out, while shielding the light beam forming the reading/writing spot WRb on the data track Da1.

In this case, the data of the data track Db2 is also read by the photodetectors P1, P2 for carrying out a writing error check in a similar manner as described above.

The data writing into the data tracks Da1 and Db2 is made in such a way that after the data writing for one of the data tracks has been completed, the data writing for the other data track is carried out, or the writing for the respective data tracks is carried out simultaneously, according to the data to be written, in the course of the movement of the reading/writing spots on the data tracks Da1, Db2.

Thus, the data is written into the data tracks Da1, Db2 while the optical recording medium 1 is being relatively moved in a direction of an arrow with respect to the reading/writing spot WRb (FIG. 6). After completion of the writing of the data into the data track, the optical system and the optical recording medium are relatively moved with respect to each other in a direction of the width of the data recording region. Thus, the tracking spot T is set on the succeeding tracking line 4 as shown in FIG. 7.

Thereafter, data is written, while checking a tracking error as described above. Thus, data writing into the data tracks Da2, Db3 are attained.

After such a sequential data writing operation along the tracking line is repeated until all the data tracks have been written.

In this connection, it is to be noted that both the data tracks Da and Db may be written simultaneously in the present embodiment.

Although two spots WRa, WRb are formed for reading/writing in the present embodiment, the two spots may be used as the tracking spot T and the reading/writing spot WR. In this case, the direction of the light beam is changed by the objective lens.

Third Embodiment

Figure 8:
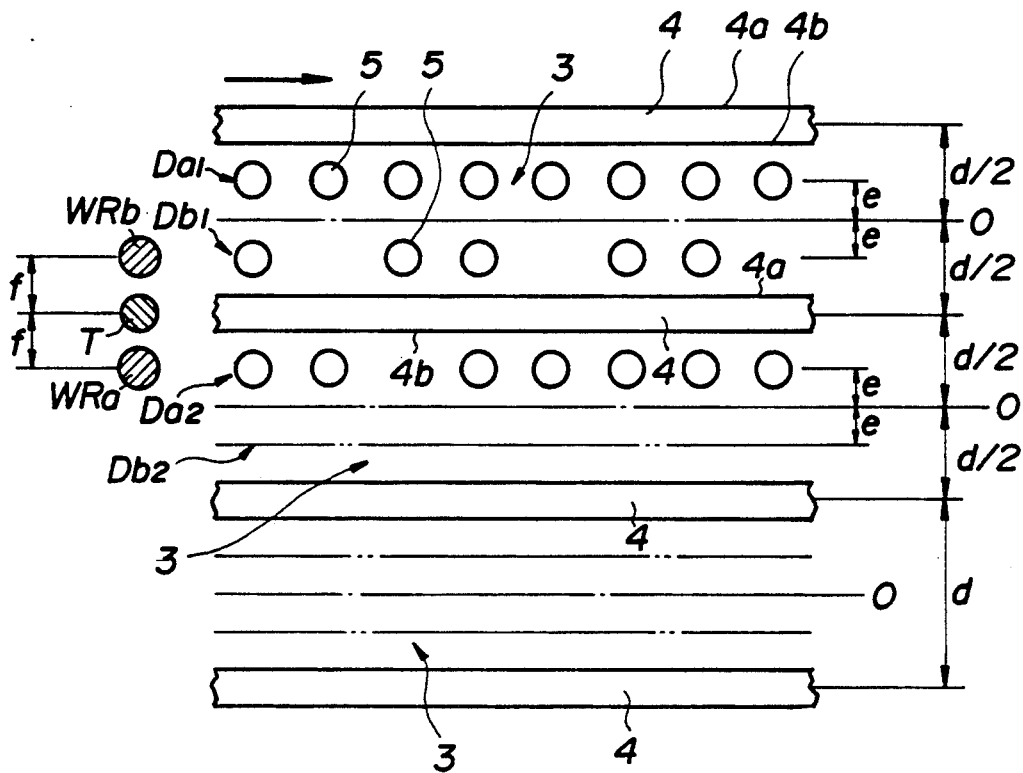

A data writing method according to the present invention as illustrated in FIG. 8 is also adapted for effecting recording at a double density as in the foregoing embodiments and applied to the optical recording medium as illustrated in FIG. 1.

According to the data writing method of the present embodiment, the reading/writing spots WRa, WRb are associated with data tracks directly adjacent to the tracking line 4. A spacing between the detecting spot T and the reading/writing spots WRa, WRb has the following relation:

$$f = \frac{d}{2} - e$$

In the present embodiment, the spacing between the respective photodetectors of the photodetector train P is determined on the basis of the above-given relation. The remaining elements and operation are similar to those of the first embodiment.

Fourth Embodiment

Figure 9:
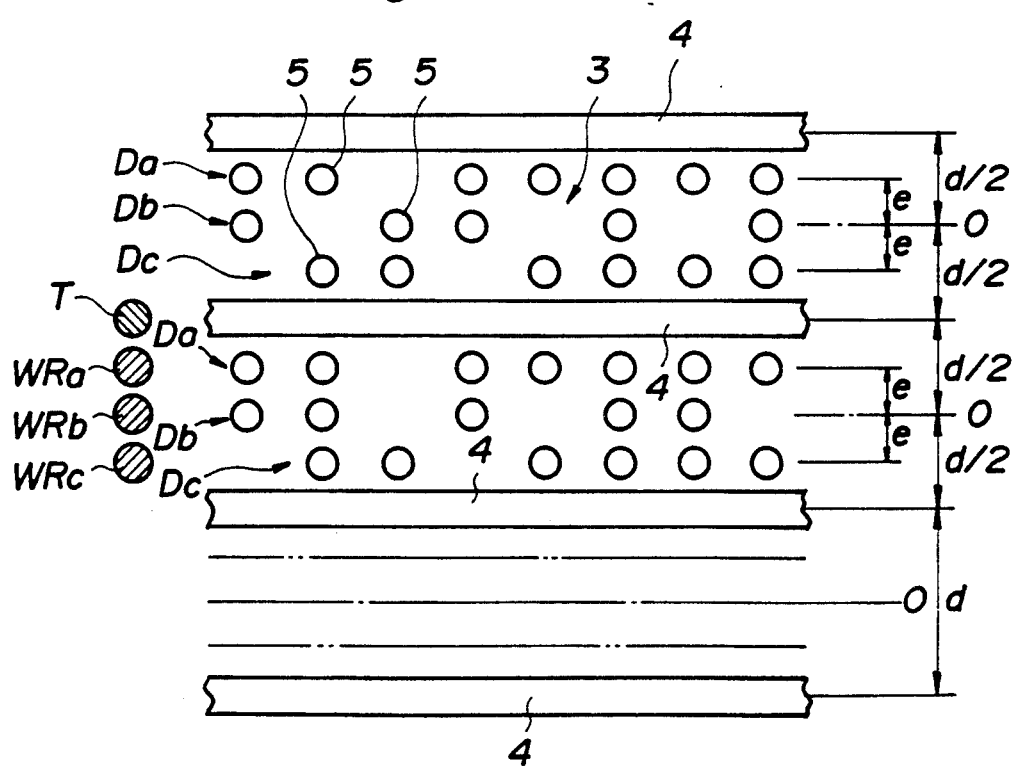

A fourth embodiment of the present invention as illustrated in FIG. 9 is different from the foregoing embodiment in that three data tracks Da, Db and Dc are set within the data recording region 3.

More particularly, the data track Db of the three data tracks Da, Db and Dc is positioned centrally in the width of the data recording region, whereas the data tracks Da and Dc are arranged symmetrically at positions deviated by e from the center of the data recording region.

The writing and reading of the optical recording medium as arranged above is effected by using the tracking spot T and the tree reading/writing spots WRa, WRb, WRc. In this case, the spot WRb of the three reading/writing spots is so located that it may write data centrally in the width of the data recording region and the spots WRa and WRc are so located that they may write data at positioned deviated symmetrically by e from the center of the data recording region.

The present embodiment is essentially identical with the second embodiment except that four light beams are formed by the optical system and four sets of photodetectors are disposed so as to correspond to the four light beams, respectively.

The three writing light spots WRa, WRb, WRc are selectively formed according to the selected data track in which data is to be written. The selection of the writing light spot is carried out in such a way that one writing light spot is used to write the data and thereafter other writing light spots are sequentially used to write data, or three writing light spots WRa, WRb, WRc are used alternatingly every data recording region, or the three writing light spots WRa, WRb, WRc are used alternatingly every spot in the data recording region to write data.

The reading/writing spots WRa, WRb, WRc may easily have a desired positional relation with the track detecting spot T by changing the diffraction grating. Or, plural light sources may be used to superimpose the reading/writing spots WRb and WRc.

Fifth Embodiment

A fifth embodiment of the tracking method for the optical recording medium of the present invention will now be described referring to FIGS. 10 and 11.

The present embodiment is applied to the optical recording medium 1 as illustrated in FIG. 2. More specifically, the tracking method according to this embodiment is used for the optical recording medium which has two data tracks Da, Db in each of the data recording region 3 at positions deviated from the center of the width thereof.

According to the tracking method of the present embodiment, two tracking spots Ta, Tb for tracing tracking lines are disposed side by side in the direction of the width of the data recording region 3 at a given interval and a reading/writing spot WR is disposed at a suitable position (at a central position in this embodiment) intermediate between the track detecting spots Ta and Tb.

Figure 10:
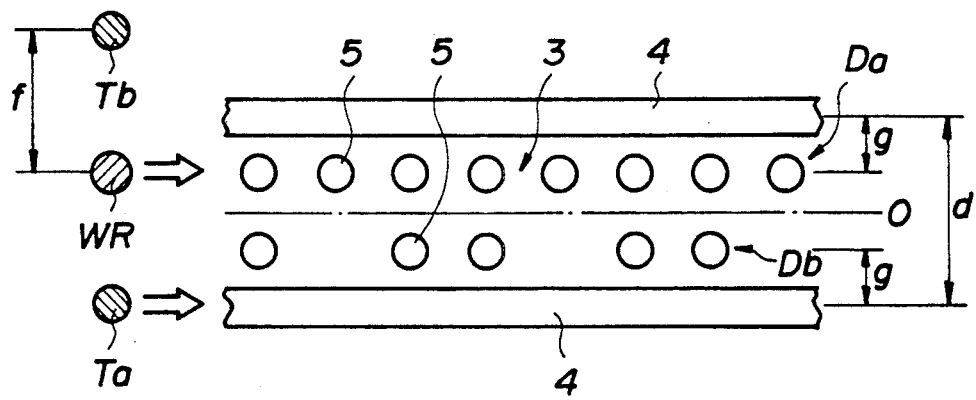
FIGS. 10 and 11 are explanatory views showing a fifth mode of tracking system for effecting the reading/writing of the optical recording medium of the present invention.
Figure 11:
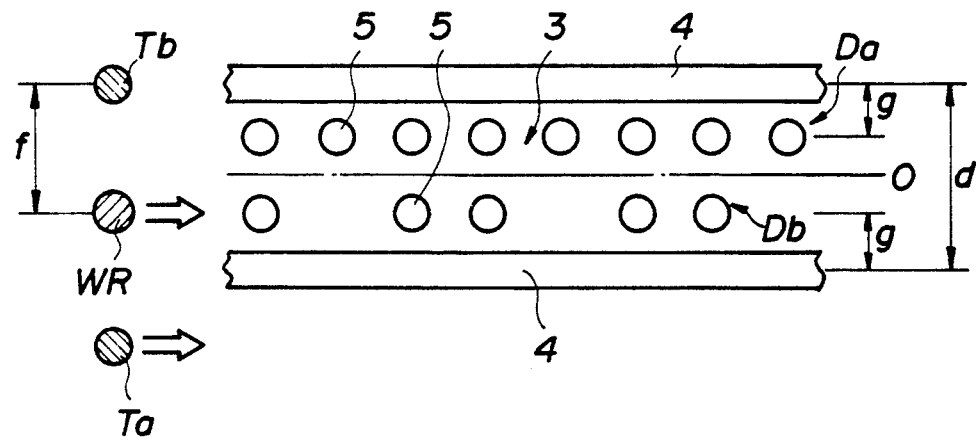

In the present embodiment, the intervals between the two track detecting spots Ta, Tb and the reading/writing spot WR disposed therebetween are so selected that when one (Ta in FIG. 10) of the track detecting spots Ta, Tb tracking the tracking line 4, the reading/writing spot WR is located on one (Da in FIG. 10) of the data tracks in the data recording region 3 and when the other track detecting spot Tb is tracking the tracking line 4 (FIG. 11), the reading/writing spot WR is located on the other data track (Db in FIG. 11).

The track detecting spots Ta, Tb and the reading/writing spot WR are formed, for example, by an optical system as illustrated in FIG. 3. According to the present embodiment, a central one of the plural light beams separated by the diffraction grating 8 is used as a reading/writing beam and the light beams on the opposite sides thereof are used as track detecting beams for detecting the tracking line. The positional relationships between these light beams correspond to those between the reading/writing spot WR and the track detecting spots Ta, Tb.

If it is now assumed that a distance between the data tracks Da, Db and the centers of the respectively adjacent tracking lines 4 is g, the spacing between the centers of the respective tracking lines 4 is d, and the spacings between the centers of the track detecting spots Ta, Tb and the reading/writing spot WR are f, there is a following relation:

$$f = d - g$$

In this embodiment, a photodetector train P is also provided for use with the optical system. The photodetector train P receives the light beam taken out of the optical system by the beam splitter 9 to function as a tracking line detection/reading sensor.

Figure 12:
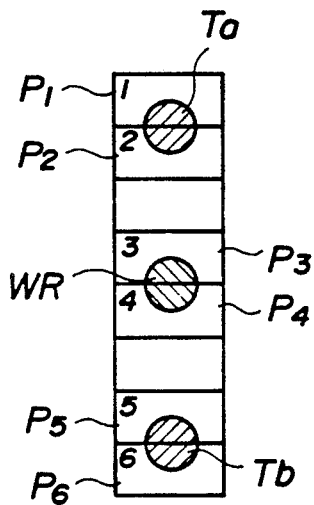
FIG. 12 is an explanatory view of another form of a train of photodetectors.

This photodetector train P is comprised of semiconductor photodetectors such as PIN photodiodes. In the present embodiment, a plurality of photodetectors P1 to P6 are arranged in array as illustrated in FIG. 12.

Among these photodetectors, a pair of P1 and P2 and another pair of P5 and P6 are used for track detection. The former pair corresponds to a detection area Ta and the latter pair corresponds to a detection area Tb. The photodetectors P3 to P4 are used for reading.

The reading/writing spot WR and the track detecting spots Ta, Tb are driven by selecting the pair of photodetectors (p1, P2) or (P5, P6) so that the reading/writing spot WR may be aligned with either one of the data tracks Da and Db. As a result of the selection, when the boundary line between the photodetectors P1 and P2 coincides with the center line of the tracking line 4, the boundary of the photodetectors P3 and P4 is located on the center line of the data track Da. When the boundary line between the photodetectors P5 and P6 coincides with the center line of the tracking line 4a, the boundary between the photodetectors P3 and P4 is located on the center line of the data track Db. FIG. 12 shows the former conditions.

The pair of photodetectors P1, P2 and the pair of photodetectors P5, P6 function identically. More specifically, when the spot Ta or Tb is centrally located on the tracking lines 4 and the pair of the photodetector forms an image centrally on the pair, the amount of light received by the adjacent photodetectors are large and the distribution of the lightness is substantially equal between the photodetectors of the pair. On the other hand, if the spot is not centrally located on the tracking line and the pair of the photodetector only has a partial image of the spot, the amount of light received is reduced and the distribution of the lightness is not equal between the photodetectors of the pair. The tracking is carried out on the basis of this principle.

Figure 13:
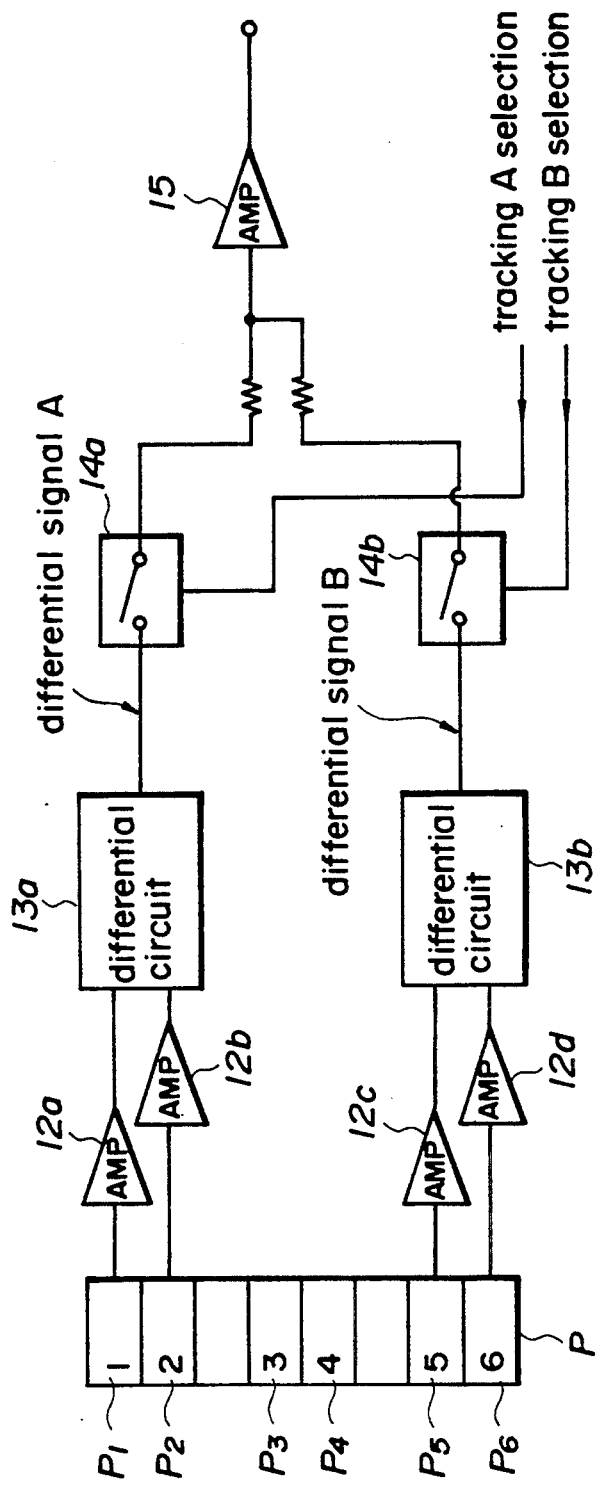
FIG. 13 is a circuit diagram of one example of a track detecting circuit employable for implementing the fifth embodiment of the present invention.

FIG. 13 illustrates a track detecting circuit. The track detecting circuit of the figure comprises a system for tracking A and a system for tracking B. These systems are selected by a tracking A selecting signal and a tracking B selecting signal, respectively. The track detecting circuit includes amplifiers 12a, 12b, 12c and 12d, to which the photodetectors P1, P2, P5, P6 are connected, respectively, for amplifying photo-outputs from the respective photodetectors; a differential amplifier 13b for obtaining a differential signal B from outputs from the amplifiers 12c and 12d; a differential circuit 13a for obtaining a differential signal A from outputs from the amplifiers 12a and 12b; an amplifier 15 for amplifying outputs from the differential circuits 13a and 13b; an analog switch 14b connected to the differential circuit 13b for supplying an output from the differential circuit 13b in response to the tracking B selecting signal; an analog switch 14a connected to the differential amplifier 15 for supplying an output from the differential amplifier 13a upon selection by the tracking A selecting signal.

The operation of the present embodiment will now be described, referring to the data reading operation. The tracking operation in the data writing is not referred to here, but it is similar to that in the writing operation.

It is now assumed that data written in a given data recording region of the recording area 2 is read out. In the reading operation, the optical system as shown in FIG. 3 is also used in the present invention to for light beams.

The reflected light from the optical recording medium 1 is reflected by the beam splitter 9 to be emitted out of the optical system. The emitted light is then incident upon the photodetector train P. At this time, the three light beams form the reading/writing spot WR and the track detecting spots Ta, Tb and produce images of these spots on the photodetector train P.

The photodetectors P1, P2, P5, P6 output photocurrents proportional to the amounts of light incident thereupon, respectively. These photo-current outputs are amplified by the amplifiers 12a, 12b, 12c and 12d, respectively, with respect to their voltages. The outputs from the former two are then input to the differential circuit 13a and the outputs from the latter two are input to the differential circuit 13b to generate differential signals A and B, respectively.

If the distribution of light amounts of the image formed from the light beam of the track detecting spots Ta incident over the pair of photodetectors P1 and P2 is equal between the two photodetectors, the photo-outputs from the photodetectors P1, P2 will be equal to each other. Therefore, the differential signal A will be 0. This means that the tracking line 4 is centrally positioned in the track detecting spot and centrally viewed by the pair of photodetectors P1, P2. If the center of the track detecting spot Ta does not coincide with the center of the tracking line 4, the photo-outputs from the respective photodetectors P1, P2 will not be equal to each other and a differential signal A corresponding to the difference will be output.

Similarly, an image of the light beam of the track detecting spot Tb is projected on the photodetectors P5, P6. However, a differential signal B corresponding to the deviation is output from the differential circuit 13a in accordance with the deviation of the tracking line 4 viewed within the spot Tb.

The differential signal A or B is amplified by the amplifier 15 upon selection by the analog switch 14a or 14b. The amplified signal is output as a tracking error signal and utilized as a tracking error alarm signal or as a tracking error correction signal. For example, if the center of the track detecting spot Ta does not coincide with the center of the tracking line 4, there is caused a difference between the output signals from the photodetectors P1, P2 to generate a differential signal A. To minimize the differential signal A, the objective lens 11 is moved by a control mechanism not shown for correction of the tracking error.

In this connection, it is to be noted that which one of the two data tracks Da and Db in the data recording region 3 is to be subjected to the reading operation is determined by an instruction from a control unit not shown. This instruction is output as the tracking A selecting signal or the tracking B selecting signal.

If it is now assumed that the tracking A signal is output, the differential signal B is substantially zero in the tracking as shown in FIG. 10 and the data of the data track Da is read. The photodetectors P3 and P4 perticipate in a reading operation. Of course, a single photodetector will suffice only for the reading. However, a pair of photodetectors are provided in the present embodiment also to carry out focuss control. Alternatively, the photodetectors P3 and P4 may be used only for the focussing and another photodetector may be additionally provided for the reading.

On the other hand, if the tracking B selecting signal is output, a differential signal is output from the differential circuit 13b through the amplifier 15. Under these conditions, if the optical system is in the tracking as shown in FIG. 11, a differential signal B is substantially zero. If the tracking line as viewed in the image of the track detecting spot Tb is deviated in the photodetectors P5 and P6, a large differential signal B is output from the differential circuit 13b. In response to this, a control mechanism not shown drives the objective lens 11 according to the differential signal B to correct a tracking error. If the degree to be corrected is large, the optical system and the optical recording medium are moved relatively with respect to each other.

Sixth Embodiment

Figure 14:
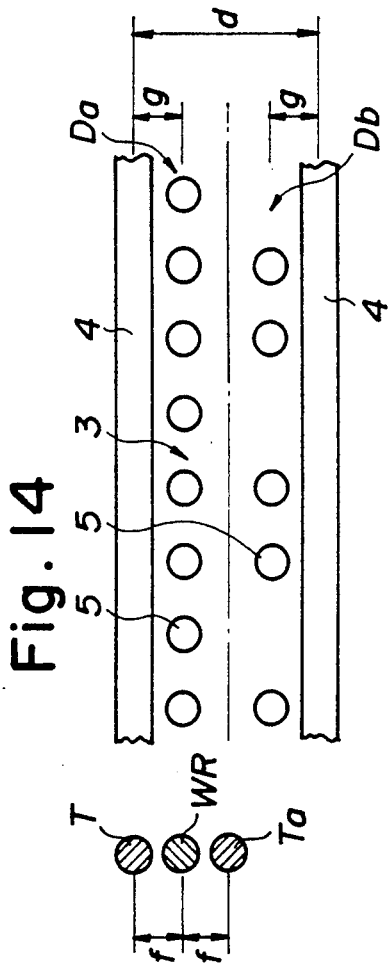
FIG. 14 is an explanatory view of a sixth embodiment of the present invention.

FIG. 14 illustrates a sixth embodiment of the present invention. A tracking method according to this embodiment also attains recording at a double density as in the fifth embodiment and is applied to the reading/writing of the optical recording medium identical with that of the fifth embodiment.

According to the tracking method of this embodiment, a reading/writing spot WR is positioned centrally between track detecting spots Ta and Tb and a distance f between the centers of the reading/writing spot and the track detecting spots Ta, Tb is selected to be equal to a spacing g which is a distance between the data track and the tracking line adjacent thereto. More particularly, there is a relation f=g. Of course, the arrangement of the photodetectors of the photodetector train P for detecting these spots is adapted to the relation.

The remaining structure and operation of this embodiment is similar to those of the fifth embodiment.

Seventh Embodiment

Figure 15:
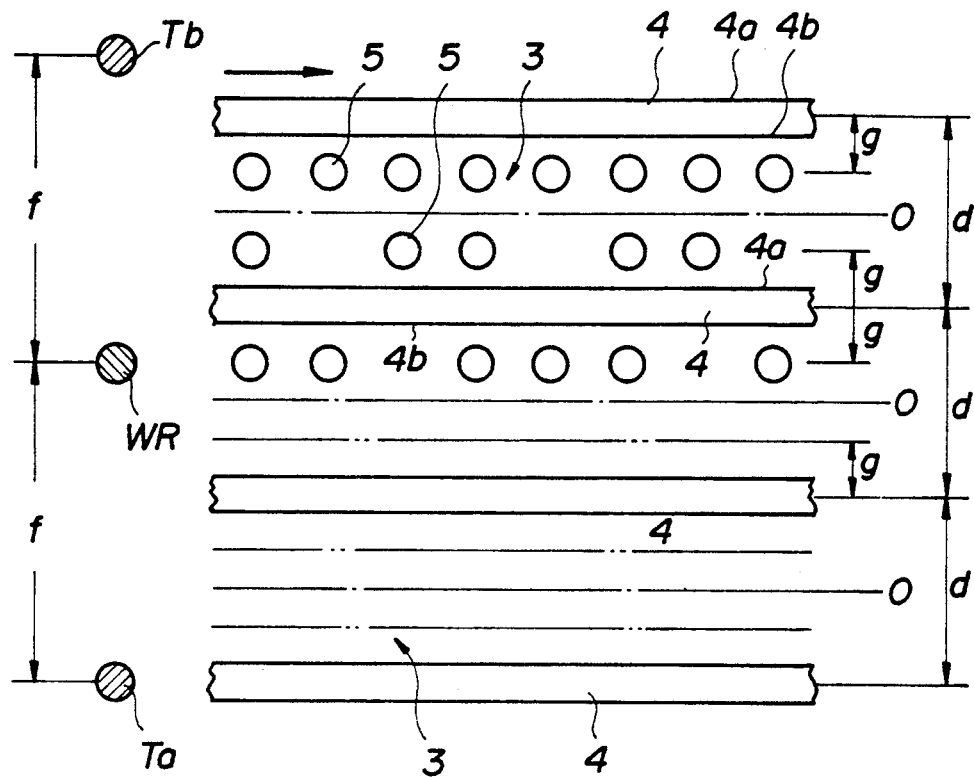
FIGS. 15 and 16 are explanatory views of a seventh embodiment of the present invention.
Figure 16:
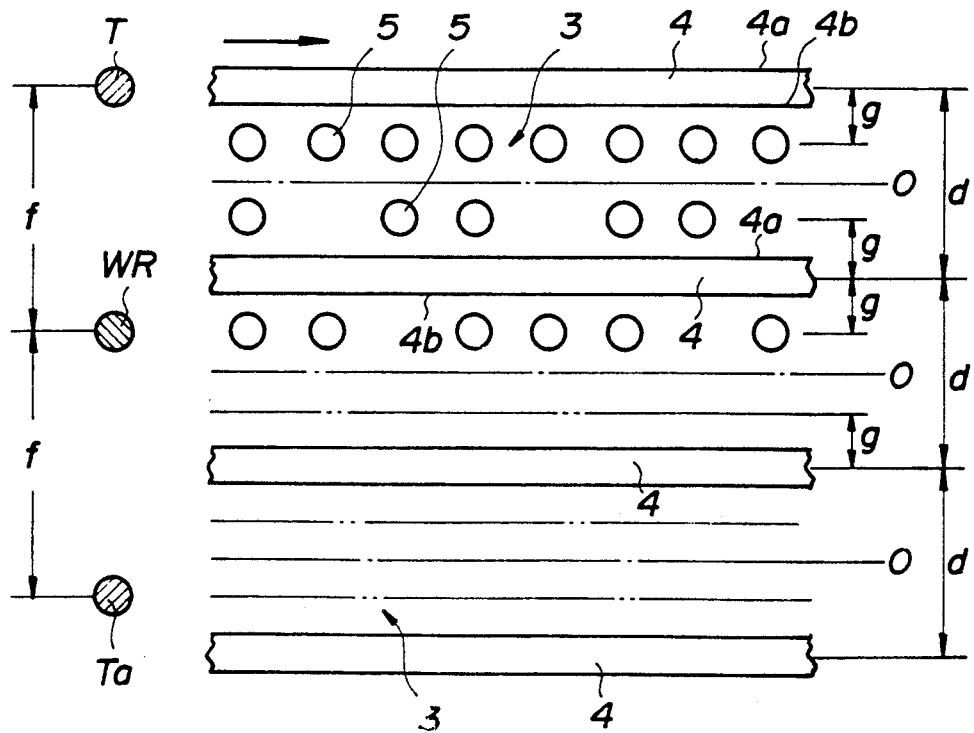

FIGS. 15 and 16 illustrate modifications of the fifth and sixth embodiments of the present invention, respectively. In these modifications, the spacings between the reading/writing spot WR and the respective track detecting spots Ta, Tb are expanded equally. In FIG. 15, there is a relation f=2d±g, while there is a relation f=d+g. The arrangement of the photodetectors of the photodetector train P for detecting these spots is adapted for the expanded spacings between the spots.

The remaining formation and operation of this modification is as in the fifth embodiment.

In this connection, it is to be noted that the relations between f, d and g in the foregoing fifth to seventh embodiments can be generally given by f=nd+g. Therefore, further modifications can be possible so far as this relation is satisfied.

Eight Embodiment

Figure 17:
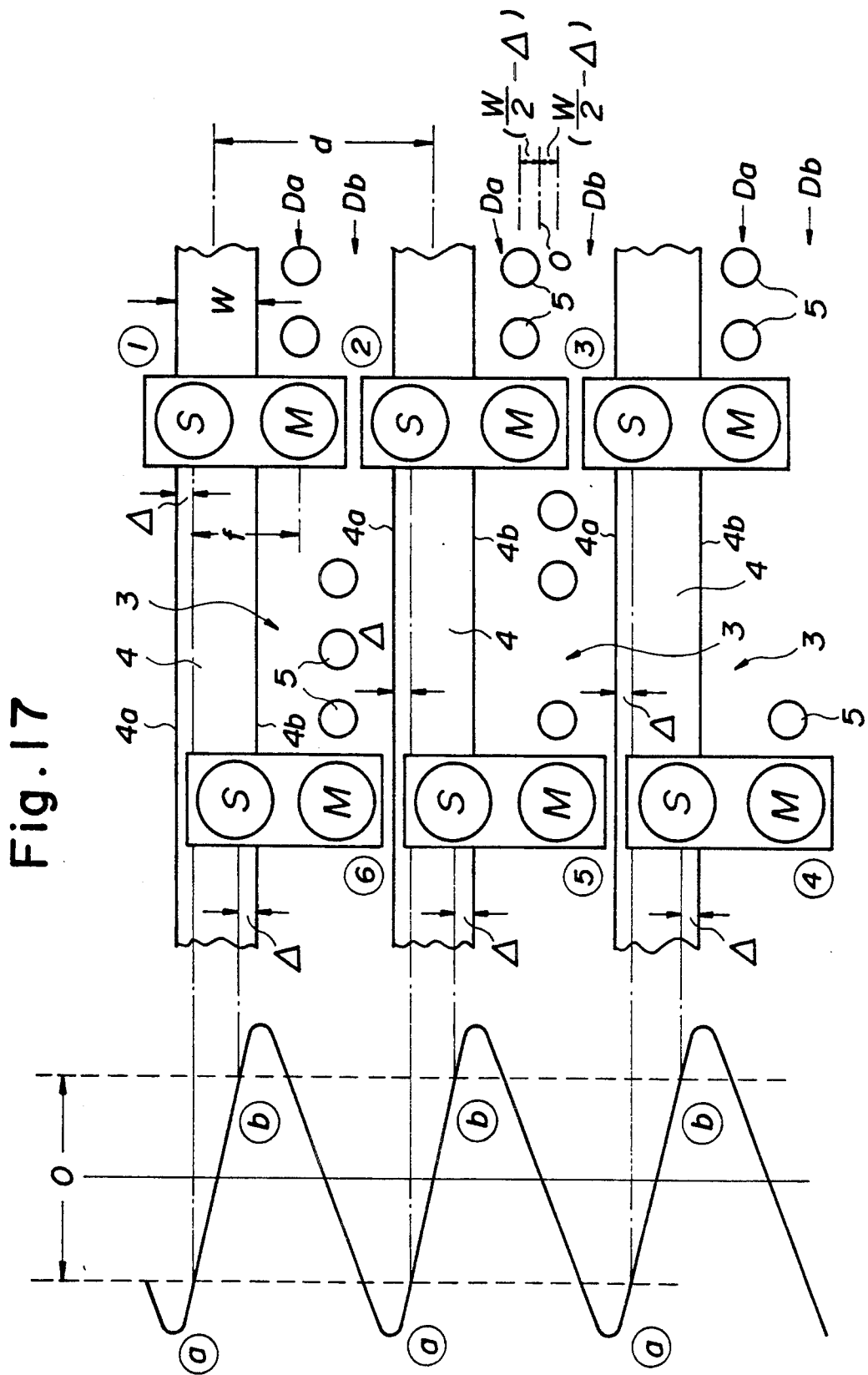
FIG. 17 is an explanatory view of an eighth form of the optical recording medium embodying the present invention.

FIG. 17 illustrates a ninth embodiment of the tracking method for the optical recording medium according to the present invention. In FIG. 17, ① to ⑥ each indicate a pair of a track detecting spot S and a reading/writing spot M. However, these pairs of spots are not different ones, but the same one, which is positioned at ① to ⑥ in the course of the relative movement of the optical system and the optical recording medium. These various positions of one pair of the spots at different times are illustrated in FIG. 17 for the convenience of explanation. However, a plurality of spots may be used instead.

The present embodiment is applied to the optical recording medium as in the first embodiment in which two data tracks are provided within each data recording region 3.

According to the present embodiment, one track detecting spot formed by a sub beam S of the plural light beams formed by the optical system and one reading/writing spot formed by a main beam M are arranged along the width of the data recording region 3.

The track detecting spot corresponds to the track detecting spot T in each of the foregoing embodiment. The reading/writing spot corresponds to the reading/writing spot WR in each of the foregoing embodiments. In the description of this embodiment, the former is denoted as a track detecting spot S and the latter is denoted as a reading/writing spot M. These spots S and M are so disposed that there is a relation f≈d/2 if the spacing between the tracking lines 4 is assumed as d.

One light beam of the plural beams separated by the diffraction grating 8 of the optical system is the reading/writing beam and the other light beam is the track detecting beam. The positional relationship between these beams corresponds to that between the reading/writing spot M and the track detecting spot S. In the present embodiment, these spots form the reading/writing spot M and the track detecting spot S.

A photodetector train P is provided in association with the optical system as described above and it responds to the light beams taken out of the optical system by the beam splitter 9 to function as a tracking line detecting sensor and/or a reading sensor.

Figure 18:
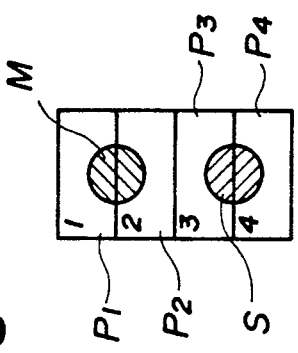
FIG. 18 is an explanatory view of an example of a train of photodetectors employable in the eighth embodiment.
Figure 19:
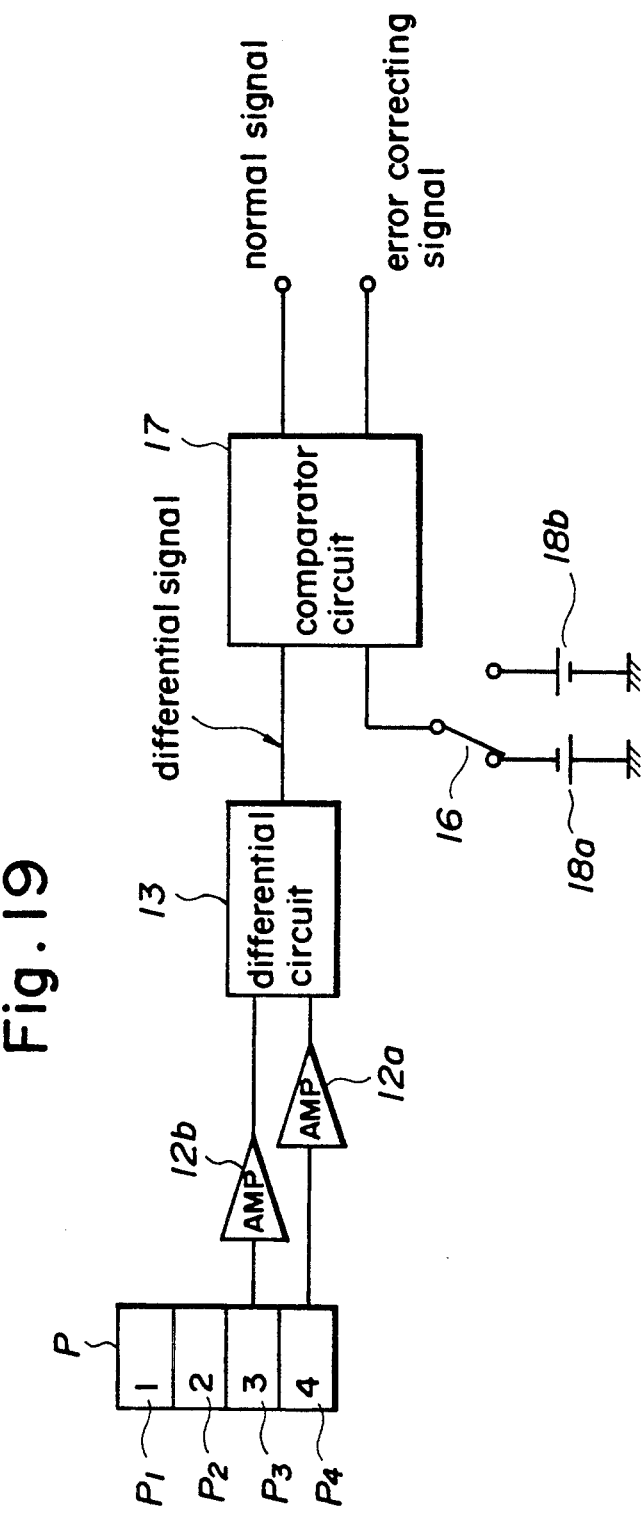
FIG. 19 is a circuit diagram showing an example of a track detecting circuit employable for implementing the eighth embodiment.

The photodetector train P is formed of semiconductor photodetectors such as PIN photodiodes and for example, four photodetectors P1 to P4 are arranged in array as illustrated in FIG. 18. In the present embodiment as illustrated, a pair of photodetectors P1 and P2 is used for reading operation, while a pair of photodetectors P3 and P4 is used for tracking line detecting operation.

Thus, the photodetectors P3 and P4 are fixed for the tracking line detecting operation. Therefore, the outputs of the respective photodetectors P3 and P4 are connected to a differential circuit 13 as a track detecting circuit, through amplifiers 12a and 12b, respectively. An output from the differential circuit 13 is input to a comparator circuit 17 in which it is compared with either one of reference power supplies 18a, 18b selectively connected by a switch 16.

On the other hand, the outputs of the respective photodetectors P1 and P2 are connected to a reading circuit not shown.

In the case where two pairs of photodetectors are provided and they are used alternatingly for tracking and for reading, the track detecting circuit and the reading circuit are selectively connected alternatingly.

As described above, one track detecting spot S and one reading/writing spot M are formed and the tracking control is carried out in association with edges of the tracking line 4. More specifically, in a mode A, the track detecting spot S tracks one of the edges, 4a, of the tracking line 4 and in a mode B, the spot S tracks another edge 4b for carrying out the reading/writing of the data. For example, in the mode A, the pair of the track detecting spot S and the reading/writing spot M carries out the data reading/writing in the respective data recording region in the order of ①, ② and ③. On the other hand, in the mode B, the pair of the track detecting spot S and the reading/writing spot M carries out the data reading/writing of the respective data recording regions in the order of ④, ⑤ and ⑥.

In order to locate the reading/writing spot M on the desired data track, the objective lens 11 is moved so that the reflected light thereof may shift in the direction of the array of the photodetector train P. More particularly, when the boundary between the photodetectors P3 and P4 coincides with the edge 4a or 4b of the tracking line 4 formed as a reflected image on the pair of the photodetectors P3 and P4 as a result of the shifting, an absolute value of the output from the differential circuit 13 will be maximum. FIG. 17 also shows the relationship between the edges and the waveform of the output from the differential circuit 13.

In the present embodiment, the positional relation between the spots M and S is so selected that the boundary between the photodetectors P1 and P2 substantially coincides with the center line of the desired data track Da or Db which is formed on the pair of the photodetectors P1 and P2 when the output from the differential circuit 13 is a bit before the maximum value (point b of the waveform in FIG. 17) or when the output is a bit after the minimum value (point a of the waveform in FIG. 17). More specifically, when the center of the track detecting spot S is positioned inner by Δ from the respective edge 4a, 4b of the tracking line 4, a normal tracking is assured.

Therefore, if the width of the tracking line 4 is assumed as W, the reading/writing spot M is located at a position deviated from the center of the width of the data recording region 3 substantially by (W/2−Δ) so as to be closer to the tracking line 4, when the track detecting spot S tracking the edge 4a of the tracking line 4. On the other hand, when the track detecting spot S is tracing the other edge 4b of the tracking line 4, the reading/writing spot M is located at a position deviated from the center of the width of the data recording region 3 substantially by (W/2−Δ) so as to be farther from the tracking line 4.

The tracking operation in the data writing according to the present embodiment will now be described. The tracking operation is similar in the reading.

It is now assumed that data is written in a given data recording region 3 of the recording area 2.

As in the first embodiment, the reflected light beam from the optical recording medium 1 which is radiated by light beams from the light source 6 of the optical system is reflected by the beam splitter 9 and emitted from the optical system.

The emitted light beams from the track detecting spot S and the reading/writing spot M are incident upon the photodetector train P and form images of the spots on the photodetector train P as illustrated in FIG. 18.

The pair of photodetectors P2, P1 and the pair of the photodetectors P3, P4 output photo-currents proportional to the amounts of the incident light when they receive the beams.

The photo-current outputs from the photodetectors P3, P4 are amplified by the amplifiers 12a, 12b, respectively and input to the differential circuit 13 to detect a differential signal. If the edge of the tracking line is included in a light beam distribution of the light beam image of the track detecting spot S which is irradiated over the pair of the photodetectors P3 and P4, the light amount distribution drastically changes at the edge and therefore the photo-outputs from the photodetectors P3 and P4 are not equal to each other. Therefore, the differential signal is not zero.

On the other hand, if the edge is not included in the light amount distribution of the light beam image of the track detecting spot S which is irradiated over the pair of the photodetectors P3 and P4, the light amount distribution is equal between the two photodetectors and therefore the photo-outputs from the respective photodetectors are equal. Thus, the differential signal is zero.

The diffential signal is compared with a reference voltage of either of the reference power supplies 18a and 18b at the comparator circuit 17. The reference power supplies 18a and 18b have reference voltages corresponding to the edge 4a of the tracking line 4 and the edge 4b of the tracking line 4, respectively.

If the track detecting spot S and the reading/writing spot M are moved in the direction of the width of the data recording region 3, the differential circuit 13 outputs a differential signal having a waveform as shown in FIG. 17. In FIG. 17, a point 0 indicates that no edge of the tracking line appears, or whole the width of the tracking line is located within the spot S or the tracking line is not located within the spot S at all. The minimum value indicates that the center line of the track detecting spot S coincides with the edge 4a of the tracking line, while the maximum value indicates that the center line of the track detecting spot S coincides with the edge 4b of the tracking line.

However it is to be noted that values a bit deviated from the minimum value and the maximum value are used as the target values for tracking in the present embodiment. More specifically, the points where the waveform and broken lines intersect as denoted by a and b in FIG. 17 are used as the target values. Therefore, the reference voltages of the reference power supplies 18a and 18b are set so as to be the target values.

In the comparator circuit 17, the differential signal is compared with the reference voltage and outputs a normal signal when the both coincide and outputs an error correcting signal when the both do not coincide. The "coincidence" used here is not limited to a strict or complete coincidence, but may have some allowance. The error correcting signal may be an alarm signal which only indicates that the differential signal does not coincide with the reference voltage, but it may be used as a feedback signal for a control mechanism (not shown) for controlling the tracking according to the degree of the inconsistency.

For example, if the center of the tracking line 4 does not coincide with the center of the track detecting spot S, there is a difference in the output signals from the photodetectors P3 and P4 and a differential signal is generated. Therefore, the objective lens 11 is moved to minimize the differential signal so as to correct the tracking error. However, if the degree to be corrected is large, the optical system and the optical recording medium are moved relatively with respect to each other.

When the writing is carried out in the mode A, the reading/writing spot M is on the data track Da if the tracking is properly done. Under these conditions, if the output of the light beam is increased, the light beam irradiates the specific portion of the data track. This causes local melting or blackening at the irradiated portion. Thus, a portion which is different, in the optical conditions such as reflectivity, from the remaining portion, in the form of an image of the reading/writing spot M. This optically differentiated portion is a dot 5. The data is thus recorded as a digital value.

The data writing into the optical recording medium may be carried out in various ways or various sequences. In the present embodiment as illustrated, first, the data is sequentially written in the each of the data recording region in the mode A, and then the data is sequentially written in the respective data recording region in the mode B. More specifically, after completion of the writing in a given data track, the optical system and the optical recording medium are relatively moved in the direction of the width of the data recording region with respect to each other. Thus, the track detecting spot S is set on an edge 4a of a next tracking line 4. The data writing is carried out in the mode A for all the data recording regions 3 and then the data is written in the mode B into the data recording regions. In FIG. 17, 1 to 3 show the mode A and 4 to 6 show the mode B.

The photodetectors P1 and P2 may be used as monitors for the writing states during the writing operation.

Although the photodetectors P1, P2 are used in a pair in the embodiment as illustrated, one photodetector will suffice only for the reading operation. However, a focussing control is also attained in the present embodiment and it requires an additional photodetector. Thus, two photodetectors are employed in the present embodiment. Alternatively, the photodetectors P1, P2 may be used only for the focussing purpose and another photodetector may further be provided for the reading purpose.

Through these sequential data writing operation along the tracking lines, the data will be written in all the data tracks. In this case, if there is a provision for counting the number of the tracking line, random accessing can also be attained.

In the reading of the data, the light beam output is reduced so as not to melt locally a portion where the beam is irradiated.

Modifications of Embodiments

The present invention is not limited to the optical recording media and the tracking method therefor as described above and various modifications or changes may be attained. Some examples of these modifications will be given in the following.

(1) Although a plurality of light beams are formed from a single light source in the foregoing embodiments, plural light source may be employed for forming light beams.

(2) In the embodiments as described above, two or three data tracks are provided in each of the data recording region, but more data tracks may of course be provided. The spacings between the data tracks may be equal or unequal.

(3) Although a plurality of data tracks are provided in each of the data recording region in the foregoing embodiments, of course a single data track may be set for each of the data recording region. In this case, the single data track is located at a position deviated from the center of the width of the data recording region. Therefore, additional writing is possible at a position oppositely deviated from the center of the width of the data recording region.

(4) The tracking line providable according to the present invention is not limited to a continuous bandlike tracking line having a width as provided in the foregoing embodiments, but it may be a broken one.

(5) In the eighth embodiment as described above, the tracking is carried out using a reference set at a bit inner than the edge of the tracking line, but the edge itself may alternatively be used as a reference.

(6) The spacing between the track detecting spot and the reading/writing spot may be selected suitably depending upon the spacing between the light beams formed by the optical system, the width of the tracking line of the optical recording medium, or the number of the data tracks.

What is claimed is:

1. A tracking method for an optical recording system including an optical system having means for projecting data reading and tracking line detection light beams, data reading and tracking photoelectric detector pairs, said detector pairs being arranged in fixed positional relationship to each other for detecting said light beams reflected by an optical medium, and tracking means for positioning by an optical medium, and tracking means for positioning said photoelectric detectors relative to said light beams reflected by said optical medium in response to detecting said tracking line detection light reflected from said optical medium, said optical medium having data tracks containing information to be read by said data reading photoelectric detectors extending along tracking lines in a data storage section of the medium wherein said tracking lines are detected by said tracking photoelectric detectors, which method comprises:
   projecting said data reading and tracking line detection light beams onto one of said data tracks and onto one of said tracking lines, respectively, of the optical recording medium;
   differentially detecting a selected one of said data reading and tracking line detection light beams reflected by said optical medium;
   determining a relative movement of said photodetectors with respect to the optical recording medium in response to said differentially detecting step;
   positioning said photoelectric detectors relative to said optical recording medium so that when said tracking line detection light beam for track detection is positioned for tracking the tracking line, the data reading light beam is positioned for reading, moving on and along a selected one of said data tracks.

2. In an optical data storage system including an optical recording medium, said system having at least a first pair and a second pair of optical readout transducers arranged at a first spacing, positioning means for positioning said optical transducers responsive to signals output from at least one of said first pair and said second pair of optical transducers, an optical recording medium having a data storage section provided thereon including at least one data recording region in the form of a band, said data recording region including a tracking line defining a boundary of said data recording region and at least one data track disposed parallel to said tracking line at a second spacing therefrom and at a position displaced from the center of the width of said data recording region wherein at least a selected one of said first pair and said second pair of said optical readout transducers senses at least one of said tracking line and said data track and another of said first and second pairs of transducers senses said at least one of said tracking line and said data track in a differential mode.

3. In an optical data storage system including an optical recording medium, said system having a pair of main beam data optical readout transducers and pair of sub-beam tracking optical readout transducers arranged at a first spacing between said pair of main beam data optical readout transducers and said pair of sub-beam tracking optical transducers including means for adjusting a position of said pairs of transducers in response to a differential output signal from said pair of sub-beam tracking optical readout transducers, an optical recording medium having a data storage section provided thereon including a plurality of juxtaposed elongated data recording regions, each of said data recording regions disposed on either side of each of a plurality of parallel pair of data tracks symmetrically disposed on either side of a center line of each of said data recording regions.

4. In an optical data storage system including an optical medium, said system having a tracking arrangement including means for reading information from an optical medium and having a light source for producing a data reading light beam and a tracking light beam, data reading means including a pair of data reading photodetectors for detecting said data reading light reflected from said optical medium and optical tracking means including a pair of tracking photodetectors for detecting said tracking light beam reflected from said optical medium and photodetector positioning means for adjusting a position of said data reading and tracking photodetectors in response to a differential signal output from said pair of tracking photodetectors, said optical medium having a data storage region including:

an elongated data recording region including first and second parallel elongated data tracks disposed symmetrically on either side of a center line of said data recording region; and first and second elongated tracking lines parallel to, and disposed on either side of, said data recording region.

* * * * *